United States Patent
Rado

(10) Patent No.: US 8,954,254 B2
(45) Date of Patent: *Feb. 10, 2015

(54) COMPUTER NETWORK FOR CALCULATING AND DISTRIBUTING THE TRUE AIRCRAFT BRAKING FRICTION COEFFICIENT FOR AN AIRCRAFT RUNWAY OR TAXIWAY USING DATA RECEIVED FROM AN AIRCRAFT'S ON BOARD FLIGHT DATA MANAGEMENT SYSTEM

(71) Applicant: Aviation Safety Technologies, LLC, Chicago, IL (US)

(72) Inventor: Zoltan Ivan Rado, State College, PA (US)

(73) Assignee: Aviation Safety Technologies, LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/999,758

(22) Filed: Mar. 19, 2014

(65) Prior Publication Data
US 2014/0207356 A1    Jul. 24, 2014

Related U.S. Application Data

(63) Continuation of application No. 13/815,370, filed on Feb. 25, 2013, now Pat. No. 8,682,561, which is a continuation of application No. 13/507,470, filed on Jun. 28, 2012, now Pat. No. 8,412,434, which is a (Continued)

(51) Int. Cl.
*B64C 25/42* (2006.01)
*B60T 8/17* (2006.01)
*B64C 19/00* (2006.01)
*G06F 19/00* (2011.01)
*B64D 45/04* (2006.01)
*B60T 8/171* (2006.01)

(52) U.S. Cl.
CPC ............... *B64C 25/42* (2013.01); *B60T 8/1703* (2013.01); *B64C 25/426* (2013.01); *B64C 19/00* (2013.01); *G06F 19/00* (2013.01); *B64D 45/04* (2013.01); *B60T 8/171* (2013.01)
USPC ............... 701/80; 303/191; 244/111; 244/1 R

(58) Field of Classification Search
USPC .............. 303/126, 177, 150; 244/1 R, 100 R, 244/110 A, 110 R, 111; 701/80, 70, 78, 83
See application file for complete search history.

(56) References Cited

U.S. PATENT DOCUMENTS 2,930,026 A    3/1960   Steigerwald
4,122,522 A    10/1978  Smith
(Continued)

*Primary Examiner* — Benjamin P Lee
(74) *Attorney, Agent, or Firm* — William P. Oberhardt

(57) ABSTRACT

This invention relates to a computer network for calculating and distributing the true braking coefficient of aircraft on runways and taxiways using a computer which obtains data from an aircraft, including in some preferable embodiments dynamic aircraft properties recorded on the aircraft's flight data management system. Environmental and aircraft parameters may also be used to calculate the braking friction coefficient. A computer and network are used to obtain data and to calculate the friction coefficient, and may be used to distribute the result. The network may utilize, at least in part, wireless local area networks to facilitate data transfer and distribution of the result. The computer for calculating the braking coefficient may be located on the aircraft.

44 Claims, 6 Drawing Sheets

Related U.S. Application Data continuation of application No. 13/374,757, filed on Jan. 11, 2012, now Pat. No. 8,244,444, which is a continuation of application No. 12/802,065, filed on May 28, 2010, now Pat. No. 8,121,771, which is a continuation of application No. 11/352,984, filed on Feb. 13, 2006, now Pat. No. 7,797,095.

(60) Provisional application No. 60/654,914, filed on Feb. 23, 2005.

(56) References Cited

U.S. PATENT DOCUMENTS

| | | |
|---|---|---|
| 4,404,633 A | 9/1983 | Goicoechea |
| 4,843,554 A | 6/1989 | Middleton et al. |
| 5,047,942 A | 9/1991 | Middleton et al. |
| 5,918,951 A | 7/1999 | Rudd, III |
| 6,418,369 B2 | 7/2002 | Matsumoto et al. |
| 6,597,980 B2 | 7/2003 | Kogure |
| 6,628,995 B1 | 9/2003 | Korson et al. |
| 6,659,400 B2 | 12/2003 | Park |
| 6,752,353 B2 | 6/2004 | Park |
| 7,035,725 B1 | 4/2006 | Park et al. |
| 7,222,507 B2 | 5/2007 | Wetzel et al. |
| 7,286,909 B2 | 10/2007 | Darke |
| 7,586,422 B2 | 9/2009 | Goodman et al. |
| 7,626,513 B2 | 12/2009 | Goodman et al. |
| 2002/0072841 A1 | 6/2002 | Kogure |
| 2003/0025035 A1 | 2/2003 | Park |
| 2004/0069902 A1 | 4/2004 | Park |
| 2004/0177671 A1 | 9/2004 | Hurson |
| 2005/0107938 A1 | 5/2005 | Wetzel et al. |
| 2007/0132311 A1 | 6/2007 | Giazotto |
| 2007/0203633 A1 | 8/2007 | Johnsen |
| 2009/0187320 A1 | 7/2009 | Antanaitis et al. |

FLIGHT DATA RECORDER SCHEMATIC

EXAMPLE PRESSURE ALTITUDE(FT) VERSUS TIME(S) DATA FROM THE FLIGHT DATA RECORDER

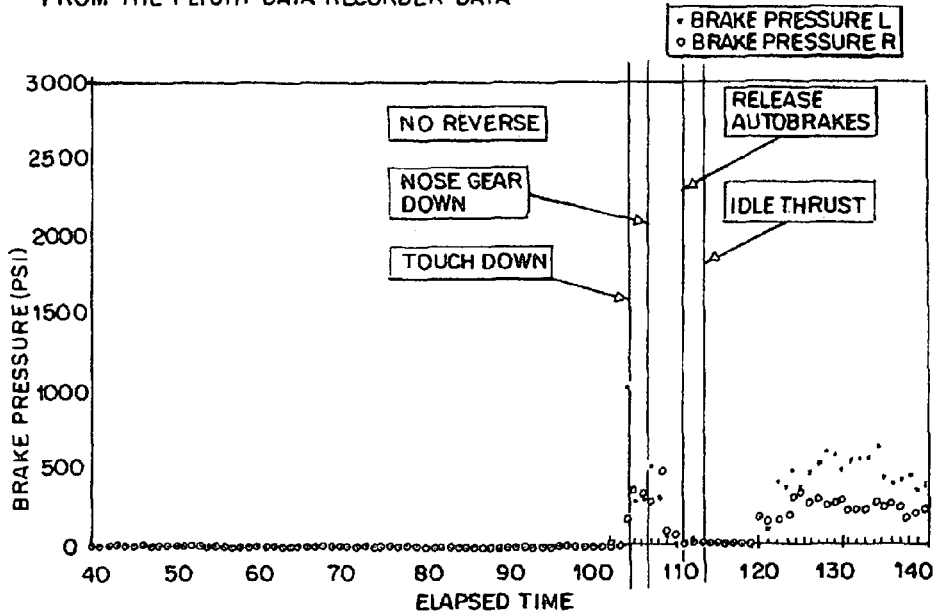
FIG. 3 EXAMPLE BRAKE PRESSURE(PSI) VERSUS TIME(S) DATA FROM THE FLIGHT DATA RECORDER DATA
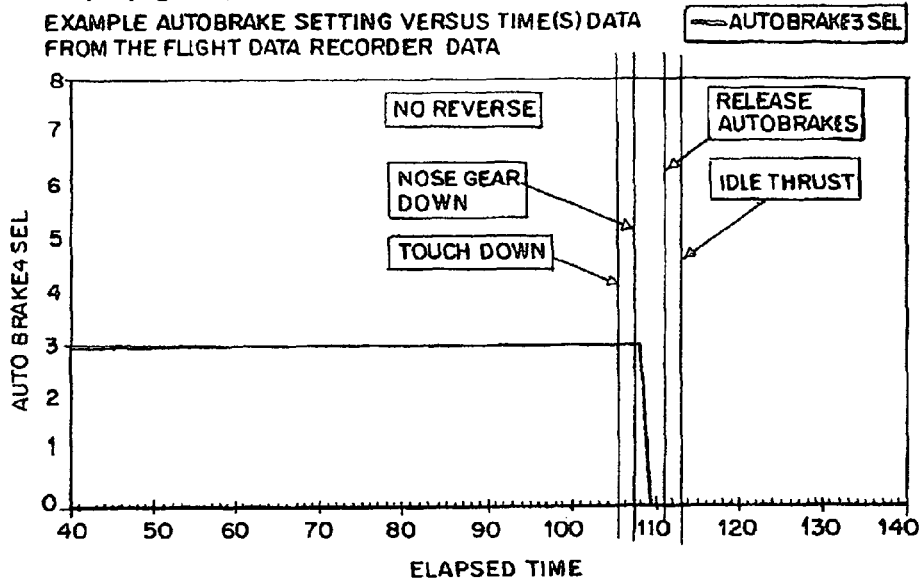
FIG. 4 EXAMPLE AUTOBRAKE SETTING VERSUS TIME(S) DATA FROM THE FLIGHT DATA RECORDER DATA

FIG. 5 A FRACTION OF EXAMPLE DATA FROM THE FLIGHT DATA RECORDER

| | | | | | | | | | | |
|---|---|---|---|---|---|---|---|---|---|---|
| TITLE:JAB289 03/03/13F-097 READOUT NO: | | | | | | | | | | |
| A/C REG:JAB289 RECORDER TYPE:DAR DATE MOUNTED: PRINT DATE:19MAR03 | | | | | | | | | | |
| A/C REG:JAB289 REC/CASSETTE NO:5480 DATE REMOVED: | | | | | | | | | | |
| ACMS VOL FILE:ANA/G1ANA/WAG1E1ROWDATA03/99K:289 | | | | | | | | | | |
| ACMS OPERATOR: PROFILE USED:30-SETUHYOU RATE:1SEC FRAME:24934 | | | | | | | | | | |
| PARAMETER | 113 | 242 | 209 | 200 | 201 | 202 | 203 | 349 | 350 | 351 | 352 | 356 | 357 |
| PARAMETER | JST | PRESSURE ALTITUDE | CAS LEFT | AILERON INBD LEFT | AILERON INBD RIGHT | AILERON OUTBD LEFT | AILERON OUTBD RIGHT | AIR/GRD SENSOR 1 | AIR/GRD SENSOR 2 | AIR/GRD SENSOR 3 | AIR/GRD SENSOR 4 | AUTOBRAK MODE 1 | AUTOBRAK MODE 2 |
| ELAPSED TIME (SEC) | HH:MM:SS | | | | | | | | | | | | |
| 1 | | | | | | | | | | | | | |
| 2 | 14:08:09 | 717 | 132 | -6.9 | -3.7 | | 1.8 | AIR | AIR | AIR | AIR | NOT | NOT |
| 3 | | 717 | 133.5 | -3.5 | -4.2 | 1.1 | | AIR | AIR | AIR | AIR | NOT | NOT |
| 4 | | 717 | 134 | -4.6 | -.6 | 0.7 | 0.4 | AIR | AIR | AIR | AIR | NOT | NOT |
| 5 | | 717 | 135.5 | -3.3 | -3.9 | | | AIR | AIR | AIR | AIR | NOT | NOT |
| 6 | 14:08:13 | 712 | 138.3 | -.7 | -5.1 | 0.7 | -0.4 | AIR | AIR | AIR | AIR | NOT | NOT |
| 7 | | 705 | 141.3 | -1.9 | -3.2 | | | AIR | AIR | AIR | AIR | NOT | NOT |
| 8 | | 693 | 142.5 | -3.7 | -3.7 | 1.1 | 1.9 | AIR | AIR | AIR | AIR | NOT | NOT |
| 9 | | 678 | 143.8 | -3.7 | -4.4 | | | AIR | AIR | AIR | AIR | NOT | NOT |
| 10 | 14:08:17 | 667 | 141.5 | -5.8 | -1.4 | 0.5 | 3.2 | AIR | AIR | AIR | AIR | NOT | NOT |
| 11 | | 653 | 140.8 | -4.7 | -2.8 | | 1.8 | AIR | AIR | AIR | AIR | NOT | NOT |
| 12 | | 637 | 141.5 | -6.5 | -3.5 | 0.9 | | AIR | AIR | AIR | AIR | NOT | NOT |
| 13 | | 622 | 139.5 | -5.3 | -3.7 | | 0.4 | AIR | AIR | AIR | AIR | NOT | NOT |
| 14 | 14:08:21 | 612 | 138.3 | -2.6 | -6.3 | 3.3 | | AIR | AIR | AIR | AIR | NOT | NOT |
| 15 | | 603 | 140.8 | -1.6 | -7.6 | | | AIR | AIR | AIR | AIR | NOT | NOT |
| 16 | | 589 | 138.8 | -1.1 | -7.2 | 1.2 | -0.4 | AIR | AIR | AIR | AIR | NOT | NOT |
| 17 | | 575 | 137.8 | -3.7 | -4.2 | | | AIR | AIR | AIR | AIR | NOT | NOT |
| 18 | 14:08:25 | 562 | 137.8 | -3.5 | -6.2 | | 0.4 | AIR | AIR | AIR | AIR | NOT | NOT |
| 19 | | 549 | 135.5 | -1.6 | -7.6 | 3.2 | | AIR | AIR | AIR | AIR | NOT | NOT |
| 20 | | 536 | 135.3 | -.4 | -4.2 | 3.7 | 1.4 | AIR | AIR | AIR | AIR | NOT | NOT |
| 21 | | 525 | 133 | -3.3 | -7.7 | | | AIR | AIR | AIR | AIR | NOT | NOT |
| 22 | 14:08:29 | 512 | 132.9 | 0.7 | -8.6 | 2.5 | -1.1 | AIR | AIR | AIR | AIR | NOT | NOT |
| 23 | | 505 | 133 | -2.1 | -6.5 | | | AIR | AIR | AIR | AIR | NOT | NOT |
| 24 | | 496 | 132 | -3.2 | -6.3 | 1.4 | 0.4 | AIR | AIR | AIR | AIR | NOT | NOT |
| 25 | | 489 | 134.3 | -1.9 | -5.1 | | 2.6 | AIR | AIR | AIR | AIR | NOT | NOT |
| 26 | 14:08:33 | 479 | 133.8 | -.6 | -2.1 | | | AIR | AIR | AIR | AIR | NOT | NOT |
| 27 | | 470 | 133.3 | -6.5 | -3.5 | 0.9 | 0.4 | AIR | AIR | AIR | AIR | NOT | NOT |
| 28 | | 461 | 133.5 | -1.9 | -6.7 | | | AIR | AIR | AIR | AIR | NOT | NOT |
| | | 455 | 132.3 | -.3 | -6.5 | 2.6 | | AIR | AIR | AIR | AIR | NOT | NOT |

THE METHOD OF THE CALCULATION

POST PROCESSING AND DISTRIBUTION

REAL-TIME PROCESSING AND DISTRIBUTION

COMPUTER NETWORK FOR CALCULATING AND DISTRIBUTING THE TRUE AIRCRAFT BRAKING FRICTION COEFFICIENT FOR AN AIRCRAFT RUNWAY OR TAXIWAY USING DATA RECEIVED FROM AN AIRCRAFT'S ON BOARD FLIGHT DATA MANAGEMENT SYSTEM

RELATED APPLICATION INFORMATION

This application is a continuation of co-pending U.S. application Ser. No. 13/815,370, filed Feb. 25, 2013, which, in turn, is a continuation of U.S. application Ser. No. 13/507,470, filed Jun. 28, 2012, now U.S. Pat. No. 8,412,434, issued Apr. 2, 2013, which, in turn, is a continuation of U.S. application Ser. No. 13/374,757, filed Jan. 11, 2012, now U.S. Pat. No. 8,244,444, issued Aug. 14, 2012, which, in turn, is a continuation of U.S. application Ser. No. 12/802,065, filed May 28, 2010, now U.S. Pat. No. 8,121,771, issued Feb. 21, 2012, which, in turn, is a continuation of U.S. application Ser. No. 11/352,984, filed Feb. 13, 2006, now U.S. Pat. No. 7,797,095, issued Sep. 14, 2010, which, in turn, claims the benefit of and priority from U.S. provisional application No. 60/654,914, filed Feb. 23, 2005, now expired, all of the disclosures of which are incorporated herein by reference.

BACKGROUND OF THE INVENTION

1. Field of Invention

This invention relates to the method and the device of calculating aircraft braking friction and other aircraft performance and pavement surface characteristics parameters related to aircraft landing and takeoff including but not limited to aircraft braking action, aircraft takeoff distance, aircraft landing distance, runway surface conditions and runway surface friction—from now on referred to as true aircraft landing performance parameters—based on the data collected or otherwise available on board of an aircraft in electronic or other format from the aircraft Flight Data Recorder (FDR) or any other flight data providing or management system for example the Quick Access Recorder (QAR).

2. Background

Under severe winter conditions airlines, airports, civil aviation organizations and countries rigorously impose limits on aircraft takeoff, landing and other surface movement operations as well as enforce weight penalties for aircraft takeoffs and landings. These limits depend on the weather, runway and taxiway surface conditions and aircraft braking and takeoff performance. At the present these limits are calculated from the assumed aircraft braking performance based on runway conditions. These conditions are established by visual inspections, weather reports and the measurements of runway friction coefficient using ground friction measurement equipment.

At the present time, there are several practices to calculate the assumed aircraft braking performance:

1. The Canadian CRFI Method:

The CRFI method comprises a runway surface friction measurement performed by braking a passenger vehicle traveling on the runway at a certain speed and measuring the maximum deceleration of it at several locations along the length of the runway. The measured deceleration data is taken then and a braking index chart is used to calculate the assumed aircraft braking performance. The obtained aircraft landing performance data and calculated assumed braking friction is provided to airline operators, pilots and airport personnel for decision making.

2. The Reported Runway Friction Coefficient by a Runway Friction Measurement Equipment.

There are a great many number of runway friction measurement devices manufactured by different companies, in different countries and working based on different principles. Some of the most common devices are: (a) continuous friction measurement equipment (CFME); (b) decelerometers; and (c) side force friction coefficient measurement equipment. This equipment is operated by airport operation personnel according to the manufacturer's instructions on the runways, aprons, and taxiways and the measured friction coefficient is recorded. The recorded friction coefficient is then distributed to airline operation personnel, pilots, and airport personnel. The measured coefficient of friction is dependent on the measurement device. Under the same conditions and on the same runway different runway friction measurement devices based on different principles will record different runway friction coefficients. These runway friction coefficients are assumed to relate to actual aircraft landing and takeoff performance.

3. The New Proposed IRFI Method:

The International Runway Friction Index (IRFI) is a computational method to harmonize the reported runway friction numbers reported by the many different runway surface friction measurement equipments. The method was developed through an international effort with 14 participating countries. The method is a mathematical procedure based on simple linear correlations. The IRFI procedure is using a mathematical transformation to take the reported measurement of a runway friction measurement device and compute using simple mathematical methods an index called the IRFI. The mathematical procedures are the same for all the different runway friction measurement device using a different set of constant parameters that was determined for each individual device. It is assumed that using this procedure the different runway friction measurement devices reporting different friction coefficients can be harmonized. The calculated IRFI is assumed to correlate to aircraft landing and takeoff performance.

4. Pre-Determined Friction Levels Based on Observed Runway Conditions, Current and Forecasted Weather Conditions:

This method is available for airport operators according to new regulations. The method is based on airport personnel driving through the runway and personally observing the runway surface conditions. The ice, snow, water and other possible surface contaminants are visually observed and their depth measured or estimated by visual observation. The estimated runway conditions with weather information are then used to lookup runway friction coefficient in a table.

All these above mentioned practices are based on the measurement of the runway friction coefficient using ground friction measuring equipment, visual observation, weather information or combinations of these. However, according to present practices, there are several problems with the measurement of the runway friction coefficient using these methods.

1. Need of a Special Device/Car:

There is a special car needed to be able to measure the runway friction coefficient. There are special devices to measure the runway friction coefficient that are commercially available; however, most of these devices are very expensive. Therefore, not every airport can afford to have one.

2. Close of Runway:

For the duration of the measurement the runway has to be closed for takeoffs and landings as well as any aircraft movement. The measurement of the runway surface friction takes a relatively large amount of time since a measuring device has to travel the whole length of the runway at a minimum one time but during severe weather conditions it is possible that more than one measurement run is needed to determine runway surface friction. The closing of an active runway causes the suspension of takeoff and landing aircraft operations for a lengthened period of time and therefore is very costly for both the airlines and the airport. The use of ground vehicles to measure runway friction poses a safety hazard especially under severe weather conditions.

3. Inaccurate Result Due to Lack of Maintenance and Inaccurate Calibration Level:

The result of the measurements are very dependent of the maintenance and the calibration level of measurement devices, therefore the result can vary much, and could lose reliability.

4. Confusing Results Due to the Differences Between Ground Friction Devices:

It has been established that the frictional values reported by different types of ground friction measurement equipment are substantially different. In fact, the same type and manufacture, and even the same model of equipment frequently report highly scattered frictional data. Calibration and measurement procedures are different for different types of devices. The repeatability and reproducibility scatter, or in other words, uncertainty of measurements for each type of ground friction measurement device, is therefore amplified and the spread of friction measurement values among different equipment types is significant.

5. Inaccurate Result Due to Rapid Weather Change:

Airport operation personnel, in taking on the responsibility of conducting friction measurements during winter storms, find it difficult to keep up with the rapid changes in the weather. During winter storms runway surface conditions can change very quickly and therefore friction measurement results can become obsolete in a short amount of time, thus misrepresenting landing and takeoff conditions.

6. Inaccurate Result Due to the Difference Between Aircraft and the Ground Equipment:

It is proven that the aircraft braking friction coefficients of contaminated runways are different for aircrafts compared to those reported by the ground friction measurement equipment.

7. Inaccurate Result Due to the Lack of Uniform Runway Reporting Practices:

For many years the international aviation community has had no uniform runway friction reporting practices. The equipment used and procedures followed in taking friction measurements vary from country to country. Therefore, friction readings at various airports because of differences in reporting practices may not be reliable enough to calculate aircraft braking performance.

Therefore this invention recognizes the need for a system directly capable of determining the true aircraft landing performance parameters based on the data collected by and available in the aircraft Flight Data Recorder (FDR) or other flight data management systems. By utilizing the novel method in this invention, for the first time all involved personnel in the ground operations of an airport and airline operations including but not limited to aircraft pilots, airline operation officers and airline managers as well as airport operators, managers and maintenance crews, will have the most accurate and most recent information on runway surface friction and aircraft braking action, especially on winter contaminated and slippery runways.

Utilizing this method the aviation industry no longer has to rely on different friction reading from different instrumentations and from different procedures.

Therefore, this method will represent a direct and substantial benefit for the aviation industry.

BRIEF SUMMARY OF THE INVENTION

Objective of Invention

The objective of this invention is to provide all personnel involved in the ground operations of an airport and involved in airline operations including but not limited to aircraft pilots, airline operation officers and airline managers as well as airport operators, managers and maintenance crews, the most accurate and most recent information on the true aircraft landing and takeoff performance parameters to help in a better and more accurate safety and economical decision making, and to prevent any accident, therefore save lives.

BRIEF SUMMARY OF THE INVENTION

This unique and novel invention is based on the fact that most modern airplanes throughout the entire flight including the takeoff and landing measures, collects and stores data on all substantial aircraft systems including the braking hydraulics, speeds and hundreds of other performance parameters. During the landing maneuver real time or after the aircraft parked at the gate this data can be retrieved, processed and the true aircraft landing performance parameters can be calculated.

During a landing usually an aircraft uses its speed brakes, spoilers, flaps and hydraulic and mechanical braking system and other means to decelerate the aircraft to acceptable ground taxi speed. The performance of these systems together with many physical parameters including but not limited to various speeds, deceleration, temperatures, pressures, winds and other physical parameters are monitored, measured, collected and stored in a data management system on board of the aircraft (FIG. 1).

All monitored parameters can be fed real time into a high powered computer system that is capable of processing the data and calculating all relevant physical processes involved in the aircraft landing maneuver. Based upon the calculated physical processes the actual effective braking friction coefficient of the landing aircraft can be calculated. This, together with other parameters and weather data, can be used to calculate the true aircraft landing performance parameters (FIG. 6).

If real time data processing is not chosen, then the collected data from the aircraft can be transported by wired, wireless or any other means into a central processing unit where the same calculation can be performed (FIG. 8).

The obtained true aircraft landing performance parameters data then can be distributed to all involved personnel in the ground operations of an airport and airline operations including but not limited to aircraft pilots, airline operation officers and airline managers as well as airport operators, managers and maintenance crews.

Utilizing the novel method in this invention for the first time all personnel involved in the ground operations of an airport and airline operations including but not limited to aircraft pilots, airline operation officers and airline managers as well as airport operators, managers and maintenance crews, will have the most accurate and most recent information on runway surface friction and aircraft braking action.

Utilizing this method, all the above mentioned (see BACKGROUND OF THE INVENTION) problems can be solved:

1. No Need of a Special Device/Car:

This method uses the airplane itself as measuring equipment, therefore no additional equipment is needed. Moreover, no additional sensor is needed. This method uses the readings of present sensors and other readily available data of an aircraft.

2. No Need for Closing of Runway:

The duration of the measurement is the landing of the aircraft itself. Therefore the runway does not have to be closed.

3. No Inaccurate Result Due to Maintenance and the Calibration Level:

Because this method uses the aircraft itself as the measuring device, there is no variation due to the maintenance and the calibration level of these ground friction measuring devices. The result of the calculation will give back the exact aircraft braking friction the aircraft actually develops and encounters.

4. No Inaccurate Result Due to the Different Between Ground Friction Devices:

Because this method uses the aircraft itself as the measuring device, there is no variation due to the different ground friction measuring devices.

5. Accurate Result Even in Rapid Weather Change:

As long as aircraft are landing on the runway, the most accurate and most recent information on the true aircraft landing performance parameters will be provided by each landing.

6. No Inaccurate Result Due to the Difference Between Aircraft and the Ground Equipment:

Because this method uses the aircraft itself as the measuring device, there is no discrepancy in the measured and real friction due to the difference between aircraft and the ground equipment.

7. No Inaccurate Result Due to the Lack of Uniform Runway Reporting Practices:

Because this method uses the aircraft itself as the measuring device, there is no variation due to the difference in reporting practices.

Utilizing this method the aviation industry no longer has to rely on different friction readings from different instrumentations and from different procedures.

Therefore, this method represents a direct and substantial safety and economic benefits for the aviation industry.

The significance of this invention involves saving substantial amount of money for the airline industry by preventing over usage of critical parts and components of the aircraft, including but not limited to brakes, hydraulics, and engines.

While increasing the safety level of the takeoffs, it could generate substantial revue for airlines by calculating the allowable take off weight, thus permissible cargo much more precisely.

BRIEF DESCRIPTION OF THE DRAWINGS

FIG. 3 is a table illustrating data available from the Flight Data Recorder of a landing aircraft to reflect Brake Pressure (in pounds per square inch) versus Time during or landing of the aircraft.

FIG. 4 is a table illustrating data available from the Flight Data Recorder of a landing aircraft to reflect Autobrake Setting versus Time during landing of the aircraft.

FIG. 5 is a table illustrating a fraction of data available from a Flight Data Recorder.

DETAILED DESCRIPTION OF THE INVENTION

Figure 1:
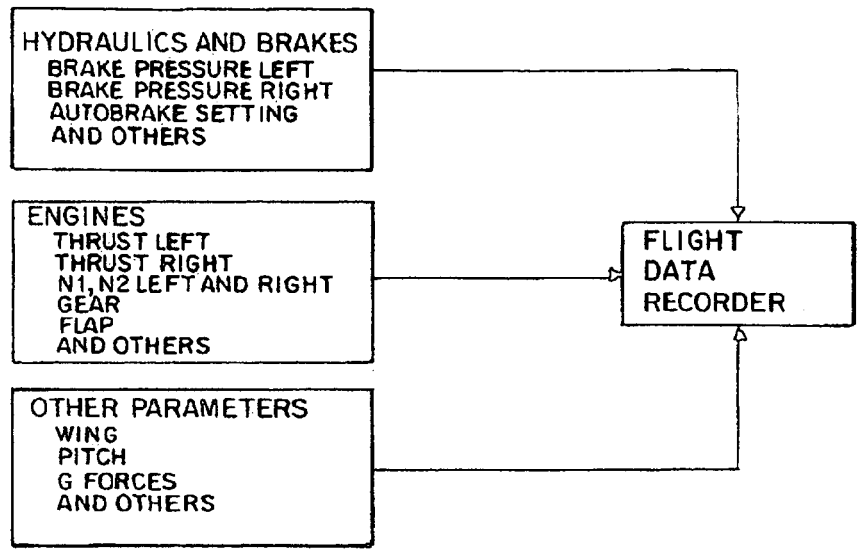
FIG. 1 is a schematic of a Flight Data Recorder illustrating the data collection structure of the Flight Data Recorder of an aircraft.

As illustrated in FIG. 1, this unique and novel invention is based on the fact that every airplane during landing uses the hydraulics and braking system. During a landing usually an aircraft uses its speed brakes, spoilers, flaps and hydraulic and mechanic braking system and other means to decelerate the aircraft to acceptable ground taxi speed. The performance of these systems together with many physical parameters including but not limited to various speeds, deceleration, temperatures, pressures, winds and other physical parameters are monitored, measured, collected and stored in a data management system on board of the aircraft. This figure presents the schematics of the three major components of data sources onboard of an aircraft relevant to this invention, the measured and recorded parameters related to the braking system, the measured and recorded parameters to the engines, flight and other control systems of the aircraft, and the dynamic, external and environmental parameters measured and recorded.

Figure 2:
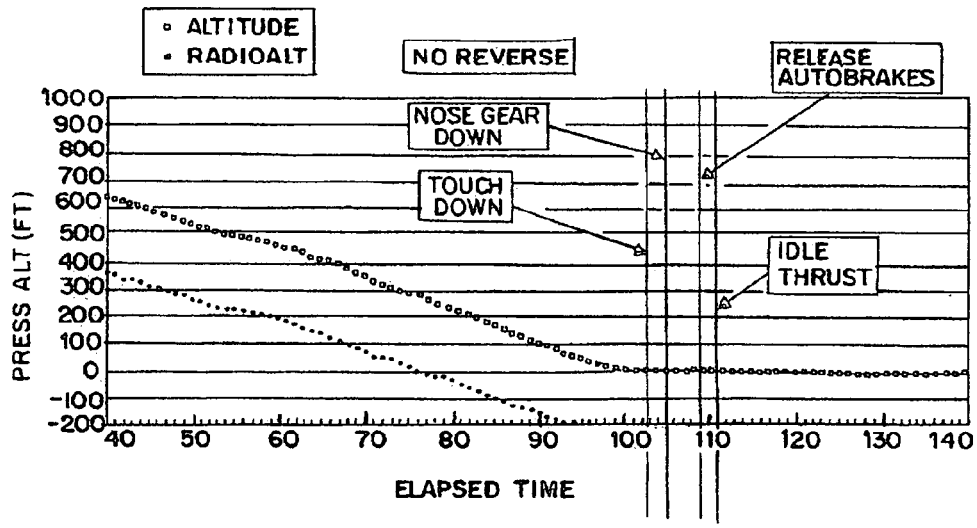
FIG. 2 is a table illustrating data available from the Flight Data Recorder of a landing aircraft to reflect Pressure Altitude (in feet) versus time during a landing of the aircraft.

As illustrated in FIGS. 2 through 5, this invention uses the sequence of data points recorded from the touch down of the aircraft until it reaches the normal taxiing speed or comes to a stop. In the continuous data stream of the flight data management system the touch down is marked by several events making it possible to detect the beginning data point of the calculation process. From that point until the aircraft comes to complete stop at the gate every necessary data points can be identified within the recorded data. FIG. 2 shows the recorded altitude measurements for an actual landing FIG. 3 depicts the measured the recorded hydraulic braking pressures, FIG. 4 presents the recorded data for the auto-brake selection and FIG. 5 illustrate the format of the recorded data that can be obtained form a digital flight data management system.

Figure 6:
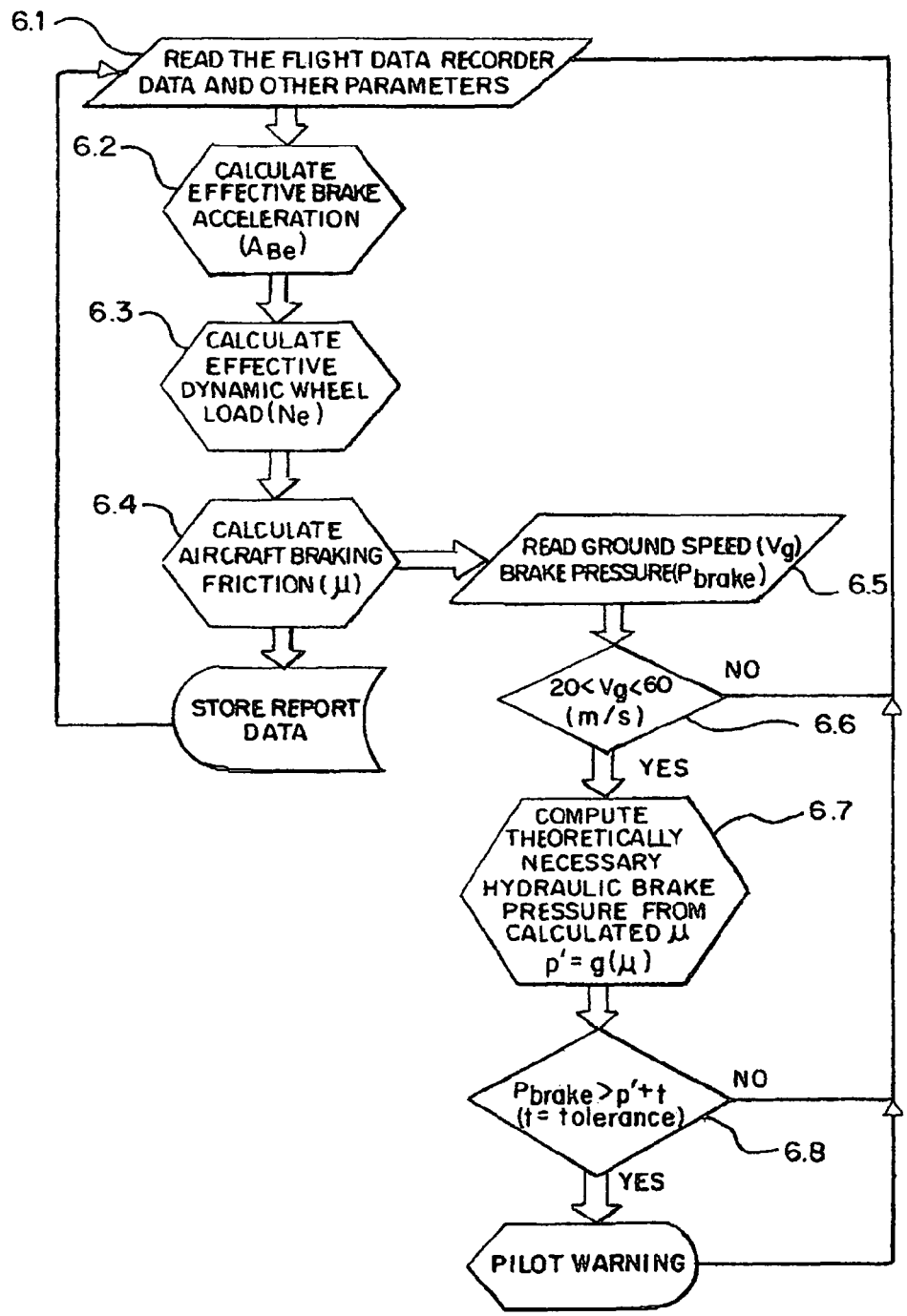
FIG. 6 is a schematic flow chart illustrating the method of determining various values generated by the present invention.

As illustrated in FIG. 6, to arrive at the end result, a number of different mathematical and physical modeling approaches are possible through different sets of dynamic equations and/or various methods of simulations based upon the availability of different sets of data from the flight data management system.

The following equations only represent an example of the possible approaches, and therefore the invention and the presented method is not limited to these equations.

6.1—The following data is used as one of the possible minimum data sets for the calculation, although more and/or different data can be utilized to calculate the same parameters and/or improve the precision of the calculation.

Data from the Flight Data Recorder:
$V_{air}$—Air Speed,
$P_{LB}, P_{RB}$—Left and Right Brake Pressure,
$V_g$—Ground Speed,
$A_x$—Longitudinal Acceleration,
$A_c$—Vertical Acceleration,
$E_{RPM}$—Engine RPM,
$S_{spoiler}$—Spoiler setting,
$S_{airbrake}$—Airbrake setting,
$S_{aileron}$—Aileron setting,
$C_{flap}$—Flap configuration,
$\theta_{pitch}$—Pitch,
$S_{RT}$—Reverse thrust setting,
$S_T$—Engine thrust setting The following environmental data are used in the calculation.
$T_{air}$—Air Temp,
$P_{alt}$—Pressure Altitude,
$P_{air}$—Air Pressure,
$H_\%$—Relative humidity,
$\Delta_{Runway}$—Runway elevation The following aircraft parameters are used in the calculation.
$M_{landing}$—Landing Mass,
$E_{type}$—Engine type,
$N_{engine}$—Number of engines,
$TY_{tire}$—Tire type,
$TY_{aircraft}$—Aircraft type 6.2—The method calculates, through a three-dimensional dynamic model, all relevant physical processes involved in the aircraft landing maneuver and separates them so they are individually available for use. The first intermediate result of the method is the time or distance history of all relevant, separated, interdependent decelerations generated by the different systems in an aircraft. These decelerations are cumulatively measured by the onboard measurement system and reported in the flight data stream. The separated decelerations calculated from the different physical processes make it possible to calculate the true deceleration developed only by the actual effective braking friction coefficient of the landing aircraft.

Based on the above, the software calculates the brake effective acceleration vs. time based on Equation (1).

$$A_{Be} = A_x - A_{Drag} - A_{ReverseThrust} - A_{RollingResistance} - A_{Pitch} \quad (1)$$

where $A_{Be}$ is the brake effective acceleration
$A_x$ is the measured cumulative longitudinal acceleration (6.1)
$A_{Drag}$ is the deceleration due to the aerodynamic drag, $$A_{Drag} = f(V_{air}, S_{spoiler}, S_{airbrake}, S_{aileron}, C_{flap}, T_{air}, P_{air}, H_\%, M_{landing}, TY_{aircraft}) \quad (2)$$

where $V_{air}, S_{spoiler}, S_{airbrake}, S_{aileron}, C_{flap}, T_{air}, P_{air}, H_\%, M_{landing}, TY_{aircraft}$ are parameters from 6.1.
$A_{ReverseThrust}$ is the acceleration caused by thrust/reverse-thrust $$A_{ReverseThrust} = f(E_{type}, N_{engine}, T_{air}, P_{air}, H_\%, E_{RPM}, S_{RT}, M_{landing}, TY_{aircraft}) \quad (3)$$

where $E_{type}, N_{engine}, T_{air}, P_{air}, H_\%, E_{RPM}, S_{RT}, M_{landing}; TY_{aircraft}$ are parameters from 6.1
$A_{RollingResistance}$ is the cumulative deceleration due to other effects such as tire rolling resistance, runway longitudinal elevation $$A_{RollingResistance} = f(tire, V_g, M_{landing}) \quad (4)$$

where tire, $V_g, M_{landing}$ are parameters from 6.1

$A_{Pitch}$ is due to the runway elevation $$A_{Pitch} = f(\Delta_{Runway}) \quad (5)$$

where $\Delta_{Runway}$ is the runway elevation from 6.1.

This true deceleration ($A_{Be}$) developed only by the actual effective braking friction coefficient of the landing aircraft, then can be used in further calculations to determine the true aircraft braking coefficient of friction.

6.3—Using the recorded data stream of the aircraft with the parameters indicated in point 6.1, plus weather and environmental factors reported by the airport or measured onboard of the aircraft and therefore available in the recorded data, together with known performance and design parameters of the aircraft available from design documentation and in the literature, the dynamic model calculates all relevant actual forces acting on the aircraft as a function of the true ground and air speeds, travel distance and time. Using the results, the dynamic wheel loads of all main gears and the nose gear can be calculated.

Since the dynamic vertical acceleration of the aircraft is measured by the onboard inertial instrumentation, the effective dynamic wheel load (N) can be calculated by the deduction of the calculated retarding forces by means of known aircraft mass; together with the determined gravitational measurement biases introduced by runway geometry and aircraft physics using Equations 6 through 9.

$$N = M_{Landing} \cdot \cos(\theta_{pitch}) \cdot g - \text{Lift} - \text{LoadTransfer} - \text{MomentumLift} + g(A_c, M_{landing}) \quad (6)$$

Where
Lift is the computed force of the sum of all lifting forces acting on the aircraft through aerodynamics:

$$\text{Lift} = f(V_{air}, S_{spoiler}, S_{airbrake}, S_{aileron}, C_{flap}, T_{air}, P_{air}, H_\%, M_{landing}, TY_{aircraft}) \quad (7)$$

where $V_{air}, S_{spoiler}, S_{airbrake}, S_{aileron}, C_{flap}, T_{air}, P_{air}, H_\%, M_{landing}, TY_{aircraft}$ are parameters from point 6.1.
LoadTransfer is the load transfer from the main landing gear to the nose gear due to the deceleration of the aircraft:

$$\text{LoadTransfer} = f(A_{Be}, M_{landing}, TY_{aircraft}) \quad (8)$$

where $A_{Be}, M_{landing}, TY_{aircraft}$ are parameters from 6.1.
MomentumLift is the generated loading or lifting forces produced by moments acting on the aircraft body due to the acting points of lift, thrust and reverse-thrust forces on the aircraft geometry:

$$\text{MomentumLift} = f(S_{Thrust}, S_{RT}, C_{flap}, TY_{aircraft}) \quad (9)$$

where $S_{Thrust}, S_{RT}, C_{flap}, TY_{aircraft}$ are parameters from point 6.1
$g(A_c, M_{landing})$ is the dynamic force acting on the landing gear due to the dynamic vertical movement of the aircraft, and thus the varying load on the main gear due to the runway roughness,
where $A_c, M_{landing}$ are parameters from point 6.1.

6.4—The deceleration caused by the wheel braking system of the aircraft calculated in point 6.2 ($A_{Be}$ is the true brake effective deceleration), together with the computed actual wheel load forces acting on the main gears of the aircraft can be used to calculate the true braking coefficient of friction. First the actual true deceleration force or friction force ($F_{Fr}$) caused by the effective braking of the aircraft have to be computed. From the brake effective deceleration ($A_{Be}$) obtained in 6.2 and the available aircraft mass, the method calculates the true effective friction force based on the formula:

$$F_{Fr} = M_{landing} \cdot A_{Be} \quad (10)$$

where $M_{landing}$ is the landing mass of the aircraft from point 6.1 and $A_{Be}$ is the calculated brake effective deceleration from Equation (1).

The determined true deceleration force ($F_{Fr}$) in equation 10 together with the actual effective dynamic wheel load (N) obtained in 6.3 can be utilized to calculate the true effective braking coefficient of friction μ using equation 11:

$$\mu = F_{Fr}/N \quad (11)$$

where

N is the calculated effective dynamic wheel force acting on the tire (6.3), and $F_{Fr}$ is the friction force from Equation (10).

6.5—Using the calculated effective true frictional forces, together with parameters measured by the aircraft data management system (such as downstream hydraulic braking pressure), a logical algorithm based on the physics of the braking of pneumatic tires with antiskid braking systems was designed to determine whether the maximum available runway friction was reached within the relevant speed ranges of the landing maneuver.

Together with the actual friction force the following logic is used by this invention to determine:

(A) If friction limited braking is encountered—If the actual available maximum braking friction available for the aircraft was reached by the braking system and even though more retardation was needed the braking system could not generate because of the insufficient amount of runway surface friction a friction limited braking was encountered.

(B) If adequate friction for the braking maneuver was available—If friction limited braking was not encountered and the braking was limited by manual braking or the preset level of the auto-brake system, the adequate surface friction and actual friction coefficient can be calculated and verified.

6.6—In order to make sure that the auto-brake and antiskid systems of the aircraft were working in their operational range, the algorithm analyzes the data to look for the friction limited sections only in an operational window where the landing speed is between 20 m/s and 60 m/s.

6.7—From the computed true effective braking coefficient of friction μ calculated in 6.4, the method computes the theoretically necessary hydraulic brake pressure $P_{brake}$ and from the dynamics of the landing parameters an applicable tolerance is calculated t.

6.8—The data is analyzed for the deviation of the applied downstream hydraulic brake pressure from the calculated theoretical brake pressure from 6.7 according to the obtained effective braking friction within the allowed operational window by the determined t tolerance. A sharp deviation of the achieved and the calculated hydraulic braking pressure is the indication of friction limited braking. When sharply increased hydraulic pressure is applied by the braking system, while no significant friction increase is generated, the potential of true friction limited braking occurs.

Figure 7:
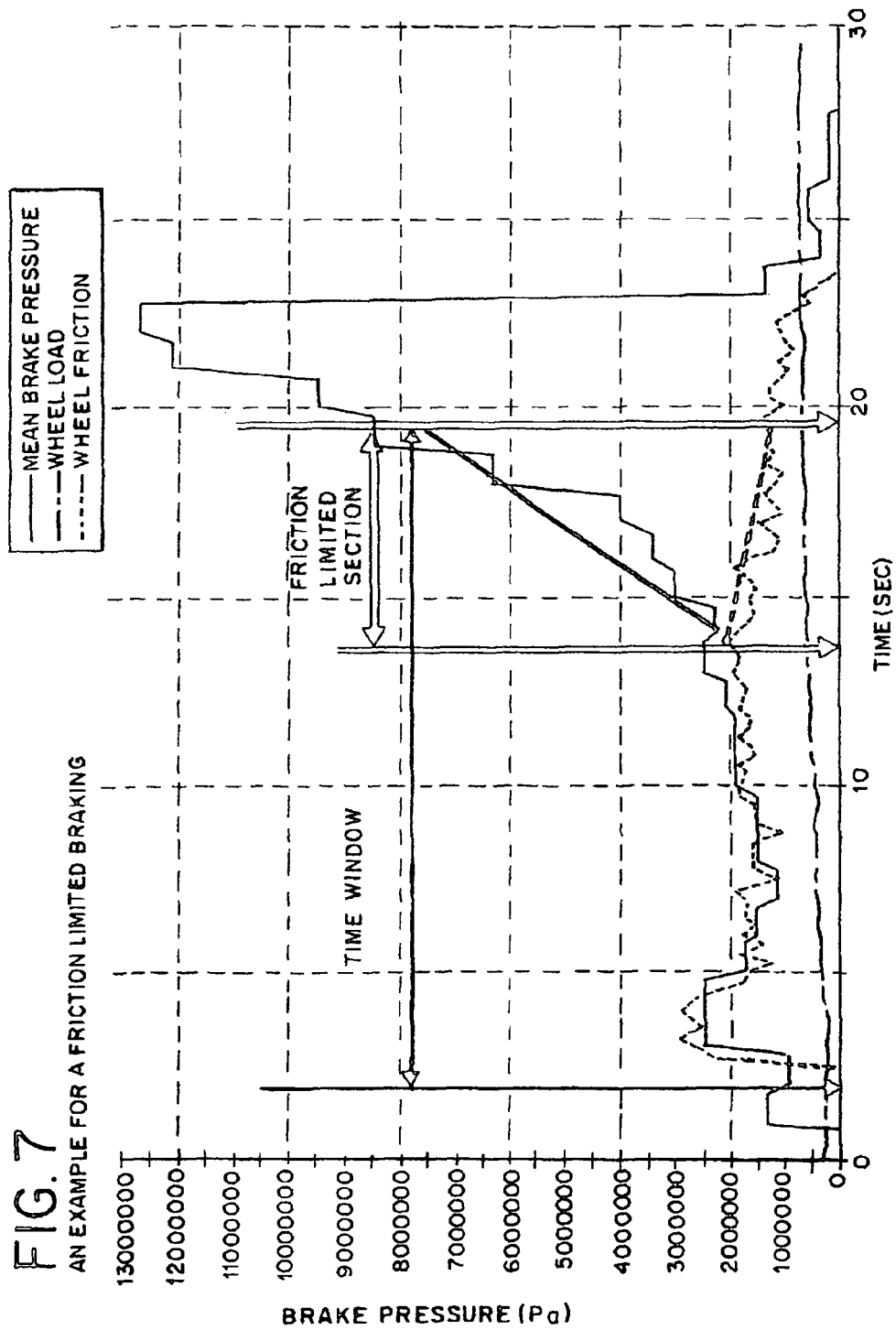
FIG. 7 is a table illustrating friction data indicative of limited braking plotting Mean Braking Pressure (in Pascals) versus Time (in Seconds) and illustrating corresponding Wheel Load and Wheel Friction.

FIG. 7 illustrates a graphical presentation for an example for the friction limited braking, where it can be seen that that a sharply increasing hydraulic pressure is applied by the braking system, while the friction is decreasing. This is a very good example for a true friction limited braking.

The Different Applications of this Method

The Post Processing

Figure 8:
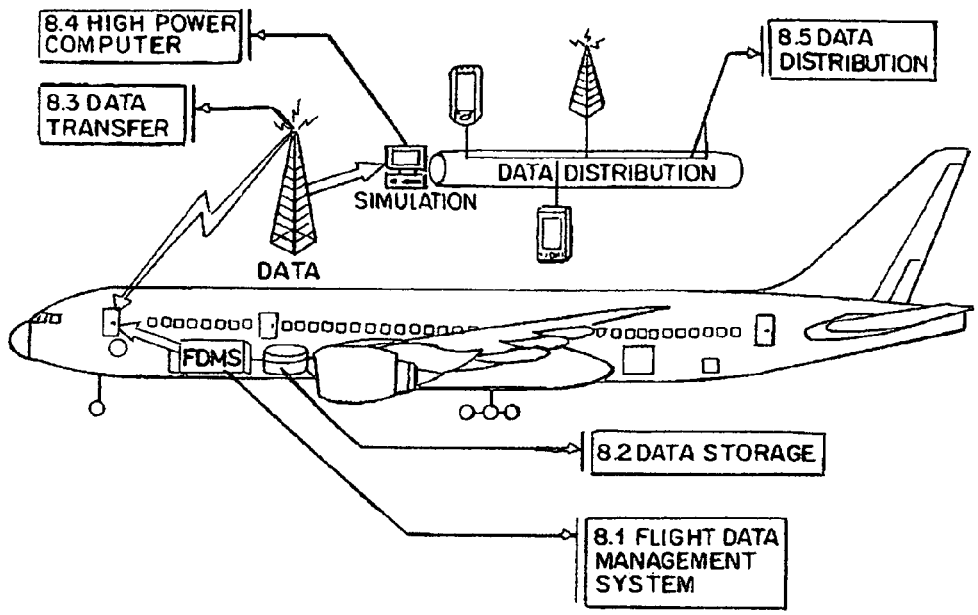
FIG. 8 is a schematic illustrating transmission of data from a Flight Data Management System of a landing aircraft for post processing and distribution.

FIG. 8 illustrates one possible approach in obtaining the true aircraft landing performance parameters is a method of post processing. The data from the aircraft flight data management system is retrieved not real time but only after the aircraft is finished its landing, taxiing and other ground maneuvers and arrived at its final ground position. The schematic of this approach is described in FIG. 8.

8.1—All monitored and available data is sent to the flight data management system throughout the aircraft landing and ground maneuver.

8.2—The Flight Data Management system collects, processes and stores the retrieved data in a data storage. The data storage is in fact part of the Flight Data Management system where all the data is stored.

8.3—Data transfer—After the airplane stopped at the gate or other designated final position, the collected data from the aircraft can be transported by wired, wireless or other means into a central processing unit.

8.4—High Power computer—All recorded parameters transported from the aircraft can be fed into a computer system, which is capable of processing the data and calculating/simulating all relevant physical processes involved in the aircraft landing maneuver and the actual effective braking friction coefficient of the landing aircraft and the true aircraft landing performance parameters can be computed and made ready for distribution.

8.5—Data Distribution—The computer distributes the calculated true landing parameters to other interested parties through wired, wireless or other data transportation means.

Real-Time Data Processing

Figure 9:
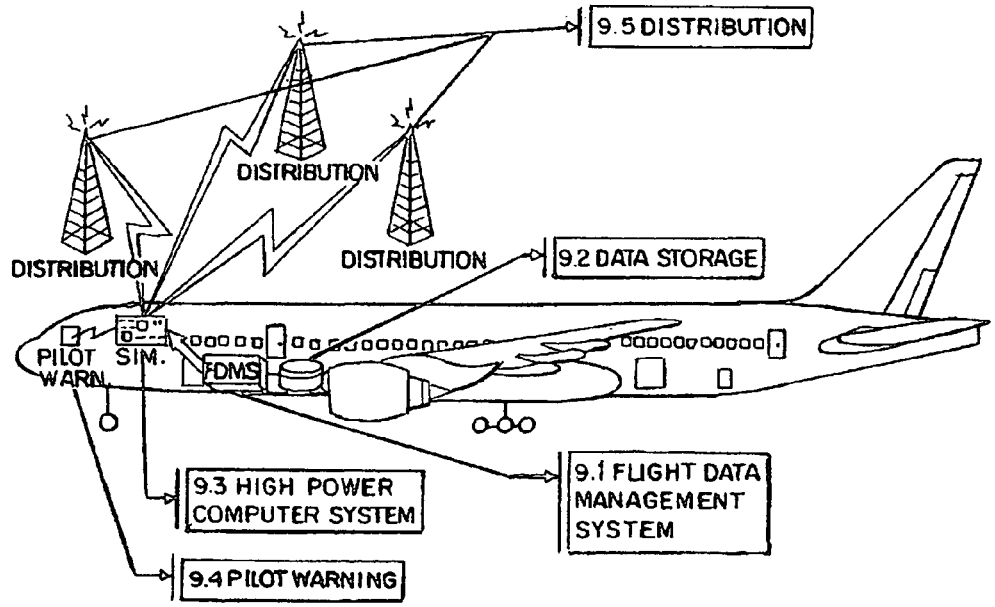
FIG. 9 is a schematic illustrating alternative real-time post processing and distribution and transmission of data from a Flight Data Management System of a landing aircraft.

As illustrated in FIG. 9, in the case of real time data processing, all monitored parameters can be fed real time into an onboard high power computer system that is capable of processing the data and calculating all relevant physical processes involved in the aircraft landing maneuver. Based upon the calculated physical processes the actual effective braking friction coefficient of the landing aircraft can be calculated. This together with other parameters and weather data can be used to calculate the true aircraft landing performance parameters. In case the calculation finds a true friction limited section, a warning can be sent to the pilot to prevent any accident, such as over run or slide off the runway.

9.1—All monitored and available data is sent to the flight data management system throughout the aircraft landing and ground maneuver.

9.2—The Flight Data Management system collects, processes and stores the retrieved data in a data storage. The data storage is in fact part of the Flight Data Management system where all the data is stored.

9.3—High power computer system: All monitored parameters are fed real time into a computer system, which is capable of processing the data and calculating/simulating all relevant physical processes involved in the aircraft landing maneuver and the actual effective braking friction coefficient of the landing aircraft and the true aircraft landing performance parameters.

9.4—Pilot warning: Based on the calculated aircraft braking coefficient and the method to search for friction limited braking it gives a warning in case the friction is too low or continuously informs the driver of the generated and available braking and cornering coefficient of friction.

9.5—Distribution: The onboard computer distributes the calculated true landing parameters to other interested parties.

Significance of the Invention

Utilizing the novel method in this invention for the first time all personnel involved in the ground operations of an airport as well as airline personnel involved in operations including but not limited to aircraft pilots, airline operation officers and airline managers as well as airport operators, managers and maintenance crews, will have the most accurate and most recent information on runway surface friction and aircraft braking action.

Utilizing this method the aviation industry no longer has to rely on different friction readings from different instrumentations and from different procedures or assumed friction levels based on visual observation and weather data.

Therefore, this method represents a direct and substantial safety and economic benefits for the aviation industry.

Economic Benefits

The significance of this invention involves knowing the true aircraft landing performance parameters for landing which yields substantial financial savings for the airline industry. While increasing the safety level of the takeoffs, it could also generate substantial revenue for airlines.

Therefore a system directly capable of determining the true aircraft landing performance parameters would represent direct and substantial economic benefit for the aviation industry including but not limited to:
1. Preventing over usage of critical parts, components of the aircraft including but not limited to brakes, hydraulics, and engines.
2. The distribution of the calculated parameters for the airport management helps make more accurate, timely and economic decisions including but not limited to decision on closing the airport or decision on the necessary maintenance.
3. The calculated parameters reported to the airline management yields more accurate and economic decision making including but not limited to permitting the calculation of allowable take off weights much more precisely thus increasing the permissible cargo limits.

Safety Benefits

The significance of this invention involves the precise assessment of the true runway surface characteristics and aircraft braking and landing performance by providing the true aircraft landing performance parameters. This is fundamental to airport aviation safety, and economical operations especially under winter conditions and slippery runways. Thus, a system directly capable of determining the true aircraft landing performance parameters real-time and under any conditions without restricting ground operations of an airport would represent direct and substantial safety benefit for the aviation industry including but not limited to:
1. Providing real-time low friction warning to help pilots to make critical decisions during landing or take-off operations to prevent accidents, costly damages or loss of human lives.
2. Eliminating the confusion in the interpretation of the different Ground Friction Measuring Device readings and therefore giving precise data to airport personnel for critical and economical decision making in airport operations and maintenance.
3. Giving an accurate assessment of the actual surface conditions of the runway, that could be used in the aircraft cargo's loading decision making for safer landing or take-offs.
4. Providing accurate data for distribution to airport management personnel assisting them in more accurate, timely and safe decision making.
5. Providing data to be reported to pilots about to land for safer and more accurate landing preparation.
6. Providing data to be reported to pilots about to take off for safer and more accurate takeoff preparation.
7. It could be reported to the airline management to for more accurate safety decision making.

I claim:

1. A computer network for calculating and distributing a true aircraft braking friction coefficient of an aircraft runway or aircraft taxiway, comprising:

(A) A computer for obtaining aircraft property data directly or indirectly from an aircraft, wherein the aircraft property data comprises data pertaining to one or more of the following aircraft properties measured at various times for the aircraft: aircraft ground speed, aircraft brake pressure, aircraft longitudinal acceleration, aircraft engine thrust setting, aircraft reverse thrust setting, aircraft engine revolutions per minute, aircraft air speed, aircraft vertical acceleration, aircraft spoiler setting, aircraft airbrake setting, aircraft aileron setting, aircraft flap configuration, aircraft pitch, and aircraft autobrake setting; and (B) Wherein the computer calculates the true aircraft braking friction coefficient of the aircraft runway or aircraft taxiway using at least some of the aircraft property data obtained by the computer.

2. The computer network for calculating and distributing the true aircraft braking friction coefficient of the aircraft runway or aircraft taxiway of claim 1 wherein:

(A) The aircraft from which the computer obtains aircraft property data has a flight data management system;

(B) The aircraft property data is recorded on the aircraft's flight data management system; and (C) Wherein the computer obtains at least some of the aircraft property data directly or indirectly from the aircraft's flight data management system.

3. The computer network for calculating and distributing the true aircraft braking friction coefficient of the aircraft runway or aircraft taxiway of claim 1 wherein the computer is located on the aircraft.

4. The computer network for calculating and distributing the true aircraft braking friction coefficient of the aircraft runway or aircraft taxiway of claim 2 wherein the computer is located on the aircraft.

5. The computer network for calculating and distributing the true aircraft braking friction coefficient of the aircraft runway or aircraft taxiway of claim 1:

(A) Wherein the computer obtains environmental parameter data directly or indirectly from one or more data sources for one or more environmental parameters chosen from the following group: air temperature, air pressure, relative humidity, wind speed, wind direction, pressure altitude, and aircraft surface elevation; and (B) Wherein the computer calculates the true aircraft braking friction coefficient of the aircraft runway or aircraft taxiway using at least some of the environmental parameter data.

6. The computer network for calculating and distributing the true aircraft braking friction coefficient of the aircraft runway or aircraft taxiway of claim 2:

(A) Wherein the computer obtains environmental parameter data directly or indirectly from one or more data sources for one or more environmental parameters chosen from the following group: air temperature, air pressure, relative humidity, wind speed, wind direction, pressure altitude, and aircraft surface elevation; and (B) Wherein the computer calculates the true aircraft braking friction coefficient of the aircraft runway or aircraft taxiway using at least some of the environmental parameter data.

7. The computer network for calculating and distributing the true aircraft braking friction coefficient of the aircraft runway or aircraft taxiway of claim 3:

(A) Wherein the computer obtains environmental parameter data directly or indirectly from one or more data sources for one or more environmental parameters chosen from the following group: air temperature, air pressure, relative humidity, wind speed, wind direction, pressure altitude, and aircraft surface elevation; and (B) Wherein the computer calculates the true aircraft braking friction coefficient of the aircraft runway or aircraft taxiway using at least some of the environmental parameter data.

8. The computer network for calculating and distributing the true aircraft braking friction coefficient of the aircraft runway or aircraft taxiway of claim 4:

(A) Wherein the computer obtains environmental parameter data directly or indirectly from one or more data sources for one or more environmental parameters chosen from the following group: air temperature, air pressure, relative humidity, wind speed, wind direction, pressure altitude, and aircraft surface elevation; and (B) Wherein the computer calculates the true aircraft braking friction coefficient of the aircraft runway or aircraft taxiway using at least some of the environmental parameter data.

9. The computer network for calculating and distributing the true aircraft braking friction coefficient of the aircraft runway or aircraft taxiway of claim 1:

(A) Wherein the computer obtains aircraft parameter data directly or indirectly from one or more data sources for one or more aircraft parameters pertaining to the aircraft chosen from the following group: aircraft landing mass, aircraft engine type, number of aircraft engines, aircraft tire type, and aircraft type; and (B) Wherein the computer calculates the true aircraft braking friction coefficient of the aircraft runway or taxiway using at least some of the aircraft parameter data.

10. The computer network for calculating and distributing the true aircraft braking friction coefficient of the aircraft runway or aircraft taxiway of claim 2:

(A) Wherein the computer obtains aircraft parameter data directly or indirectly from one or more data sources for one or more aircraft parameters pertaining to the aircraft chosen from the following group: aircraft landing mass, aircraft engine type, number of aircraft engines, aircraft tire type, and aircraft type; and (B) Wherein the computer calculates the true aircraft braking friction coefficient of the aircraft runway or taxiway using at least some of the aircraft parameter data.

11. The computer network for calculating and distributing the true aircraft braking friction coefficient of the aircraft runway or aircraft taxiway of claim 3:

(A) Wherein the computer obtains at least some of the aircraft parameter data directly or indirectly from one or more data sources for one or more aircraft parameters pertaining to the aircraft chosen from the following group: aircraft landing mass, aircraft engine type, number of aircraft engines, aircraft tire type, and aircraft type; and (B) Wherein the computer calculates the true aircraft braking friction coefficient of the aircraft runway or taxiway using at least some of the aircraft parameter data.

12. The computer network for calculating and distributing the true aircraft braking friction coefficient of the aircraft runway or aircraft taxiway of claim 4:

(A) Wherein the computer obtains at least some of the aircraft parameter data directly or indirectly from one or more data sources for one or more aircraft parameters pertaining to the aircraft chosen from the following group: aircraft landing mass, aircraft engine type, number of aircraft engines, aircraft tire type, and aircraft type; and (B) Wherein the computer calculates the true aircraft braking friction coefficient of the aircraft runway or taxiway using at least some of the aircraft parameter data.

13. The computer network for calculating and distributing the true aircraft braking friction coefficient of the aircraft runway or aircraft taxiway of claim 5:

(A) Wherein the computer obtains aircraft parameter data directly or indirectly from one or more data sources for one or more aircraft parameters pertaining to the aircraft chosen from the following group: aircraft landing mass, aircraft engine type, number of aircraft engines, aircraft tire type, and aircraft type; and (B) Wherein the computer calculates the true aircraft braking friction coefficient of the aircraft runway or taxiway using at least some of the aircraft parameter data.

14. The computer network for calculating and distributing the true aircraft braking friction coefficient of the aircraft runway or aircraft taxiway of claim 6:

(A) Wherein the computer obtains aircraft parameter data directly or indirectly from one or more data sources for one or more aircraft parameters pertaining to the aircraft chosen from the following group: aircraft landing mass, aircraft engine type, number of aircraft engines, aircraft tire type, and aircraft type; and (B) Wherein the computer calculates the true aircraft braking friction coefficient of the aircraft runway or taxiway using at least some of the aircraft parameter data.

15. The computer network for calculating and distributing the true aircraft braking friction coefficient of the aircraft runway or aircraft taxiway of claim 7:

(A) Wherein the computer obtains aircraft parameter data directly or indirectly from one or more data sources for one or more aircraft parameters pertaining to the aircraft chosen from the following group: aircraft landing mass, aircraft engine type, number of aircraft engines, aircraft tire type, and aircraft type; and (B) Wherein the computer calculates the true aircraft braking friction coefficient of the aircraft runway or taxiway using at least some of the aircraft parameter data.

16. The computer network for calculating and distributing the true aircraft braking friction coefficient of the aircraft runway or aircraft taxiway of claim 8:

(A) Wherein the computer obtains aircraft parameter data directly or indirectly from one or more data sources for one or more aircraft parameters pertaining to the aircraft chosen from the following group: aircraft landing mass, aircraft engine type, number of aircraft engines, aircraft tire type, and aircraft type; and (B) Wherein the computer calculates the true aircraft braking friction coefficient of the aircraft runway or taxiway using at least some of the aircraft parameter data.

17. The computer network for calculating and distributing the true aircraft braking friction coefficient of the aircraft runway or taxiway of claim 1, wherein the true aircraft braking friction coefficient calculated by the computer may be accessed by or provided to one or more of the following individuals or entities via the computer network: airline operation personnel, pilots, airport personnel, airline managers, airport managers, airport maintenance crews, pilots of aircraft scheduled to take off, land, or taxi on the aircraft runway or taxiway, personnel involved in ground operations where the aircraft runway or taxiway is located, aircraft scheduling and dispatch personnel, flight service center personnel, government aviation authority personnel, air traffic controllers, airline employees, and aircraft manufacturers.

18. The computer network for calculating and distributing the true aircraft braking friction coefficient of the aircraft runway or taxiway of claim 2, wherein the true aircraft braking friction coefficient calculated by the computer may be accessed by or provided to one or more of the following individuals or entities via the computer network: airline operation personnel, pilots, airport personnel, airline managers, airport managers, airport maintenance crews, pilots of aircraft scheduled to take off, land, or taxi on the aircraft runway or taxiway, personnel involved in ground operations where the aircraft runway or taxiway is located, aircraft scheduling and dispatch personnel, flight service center personnel, government aviation authority personnel, air traffic controllers, airline employees, and aircraft manufacturers.

19. The computer network for calculating and distributing the true aircraft braking friction coefficient of the aircraft runway or taxiway of claim 3, wherein the true aircraft braking friction coefficient calculated by the computer may be accessed by or provided to one or more of the following individuals or entities via the computer network: airline operation personnel, pilots, airport personnel, airline managers, airport managers, airport maintenance crews, pilots of aircraft scheduled to take off, land, or taxi on the aircraft runway or taxiway, personnel involved in ground operations where the aircraft runway or taxiway is located, aircraft scheduling and dispatch personnel, flight service center personnel, government aviation authority personnel, air traffic controllers, airline employees, and aircraft manufacturers.

20. The computer network for calculating and distributing the true aircraft braking friction coefficient of the aircraft runway or taxiway of claim 4, wherein the true aircraft braking friction coefficient calculated by the computer may be accessed by or provided to one or more of the following individuals or entities vie the computer network: airline operation personnel, pilots, airport personnel, airline managers, airport managers, airport maintenance crews, pilots of aircraft scheduled to take off, land, or taxi on the aircraft runway or taxiway, personnel involved in ground operations where the aircraft runway or taxiway is located, aircraft scheduling and dispatch personnel, flight service center personnel, government aviation authority personnel, air traffic controllers, airline employees, and aircraft manufacturers.

21. The computer network for calculating and distributing the true aircraft braking friction coefficient of the aircraft runway or taxiway of claim 5, wherein the true aircraft braking friction coefficient calculated by the computer may be accessed by or provided to one or more of the following individuals or entities via the computer network: airline operation personnel, pilots, airport personnel, airline managers, airport managers, airport maintenance crews, pilots of aircraft scheduled to take off, land, or taxi on the aircraft runway or taxiway, personnel involved in ground operations where the aircraft runway or taxiway is located, aircraft scheduling and dispatch personnel, flight service center personnel, government aviation authority personnel, air traffic controllers, airline employees, and aircraft manufacturers.

22. The computer network for calculating and distributing the true aircraft braking friction coefficient of the aircraft runway or taxiway of claim 6, wherein the true aircraft braking friction coefficient calculated by the computer may be accessed by or provided to one or more of the following individuals or entities via the computer network: airline operation personnel, pilots, airport personnel, airline managers, airport managers, airport maintenance crews, pilots of aircraft scheduled to take off, land, or taxi on the aircraft runway or taxiway, personnel involved in ground operations where the aircraft runway or taxiway is located, aircraft scheduling and dispatch personnel, flight service center personnel, government aviation authority personnel, air traffic controllers, airline employees, and aircraft manufacturers.

23. The computer network for calculating and distributing the true aircraft braking friction coefficient of the aircraft runway or taxiway of claim 7, wherein the true aircraft braking friction coefficient calculated by the computer may be accessed by or provided to one or more of the following individuals or entities via the computer network: airline operation personnel, pilots, airport personnel, airline managers, airport managers, airport maintenance crews, pilots of aircraft scheduled to take off, land, or taxi on the aircraft runway or taxiway, personnel involved in ground operations where the aircraft runway or taxiway is located, aircraft scheduling and dispatch personnel, flight service center personnel, government aviation authority personnel, air traffic controllers, airline employees, and aircraft manufacturers.

24. The computer network for calculating and distributing the true aircraft braking friction coefficient of the aircraft runway or taxiway of claim 8, wherein the true aircraft braking friction coefficient calculated by the computer may be accessed by or provided to one or more of the following individuals or entities via the computer network: airline operation personnel, pilots, airport personnel, airline managers, airport managers, airport maintenance crews, pilots of aircraft scheduled to take off, land, or taxi on the aircraft runway or taxiway, personnel involved in ground operations where the aircraft runway or taxiway is located, aircraft scheduling and dispatch personnel, flight service center personnel, government aviation authority personnel, air traffic controllers, airline employees, and aircraft manufacturers.

25. The computer network for calculating and distributing the true aircraft braking friction coefficient of the aircraft runway or taxiway of claim 9, wherein the true aircraft braking friction coefficient calculated by the computer may be accessed by or provided to one or more of the following individuals or entities via the computer network: airline operation personnel, pilots, airport personnel, airline managers, airport managers, airport maintenance crews, pilots of aircraft scheduled to take off, land, or taxi on the aircraft runway or taxiway, personnel involved in ground operations where the aircraft runway or taxiway is located, aircraft scheduling and dispatch personnel, flight service center personnel, government aviation authority personnel, air traffic controllers, airline employees, and aircraft manufacturers.

26. The computer network for calculating and distributing the true aircraft braking friction coefficient of the aircraft runway or taxiway of claim 10, wherein true aircraft braking friction coefficient calculated by the computer may be accessed by or provided to one or more of the following individuals or entities via the computer network: airline operation personnel, pilots, airport personnel, airline managers, airport managers, airport maintenance crews, pilots of aircraft scheduled to take off, land, or taxi on the aircraft runway or taxiway, personnel involved in ground operations where the aircraft runway or taxiway is located, aircraft scheduling and dispatch personnel, flight service center personnel, government aviation authority personnel, air traffic controllers, airline employees, and aircraft manufacturers.

27. The computer network for calculating and distributing the true aircraft braking friction coefficient of the aircraft runway or taxiway of claim 11, wherein true aircraft braking friction coefficient calculated by the computer may be accessed by or provided to one or more of the following individuals or entities via the computer network: airline operation personnel, pilots, airport personnel, airline managers, airport managers, airport maintenance crews, pilots of aircraft scheduled to take off, land, or taxi on the aircraft 28. The computer network for calculating and distributing the true aircraft braking friction coefficient of the aircraft runway or taxiway of claim 12, wherein true aircraft braking friction coefficient calculated by the computer may be accessed by or provided to one or more of the following individuals or entities via the computer network: airline operation personnel, pilots, airport personnel, airline managers, airport managers, airport maintenance crews, pilots of aircraft scheduled to take off, land, or taxi on the aircraft runway or taxiway, personnel involved in ground operations where the aircraft runway or taxiway is located, aircraft scheduling and dispatch personnel, flight service center personnel, government aviation authority personnel, air traffic controllers, airline employees, and aircraft manufacturers.

29. The computer network for calculating and distributing the true aircraft braking friction coefficient of the aircraft runway or taxiway of claim 13, wherein true aircraft braking friction coefficient calculated by the computer may be accessed by or provided to one or more of the following individuals or entities via the computer network: airline operation personnel, pilots, airport personnel, airline managers, airport managers, airport maintenance crews, pilots of aircraft scheduled to take off, land, or taxi on the aircraft runway or taxiway, personnel involved in ground operations where the aircraft runway or taxiway is located, aircraft scheduling and dispatch personnel, flight service center personnel, government aviation authority personnel, air traffic controllers, airline employees, and aircraft manufacturers.

30. The computer network for calculating and distributing the true aircraft braking friction coefficient of the aircraft runway or taxiway of claim 14, wherein the true aircraft braking friction coefficient calculated by the computer may be accessed by or provided to one or more of the following individuals or entities via the computer network: airline operation personnel, pilots, airport personnel, airline managers, airport managers, airport maintenance crews, pilots of aircraft scheduled to take off, land, or taxi on the aircraft runway or taxiway, personnel involved in ground operations where the aircraft runway or taxiway is located, aircraft scheduling and dispatch personnel, flight service center personnel, government aviation authority personnel, air traffic controllers, airline employees, and aircraft manufacturers.

31. The computer network for calculating and distributing the true aircraft braking friction coefficient of the aircraft runway or taxiway of claim 15, wherein the true aircraft braking friction coefficient calculated by the computer may be accessed by or provided to one or more of the following individuals or entities via the computer network: airline operation personnel, pilots, airport personnel, airline managers, airport managers, airport maintenance crews, pilots of aircraft scheduled to take off, land, or taxi on the aircraft runway or taxiway, personnel involved in ground operations where the aircraft runway or taxiway is located, aircraft scheduling and dispatch personnel, flight service center personnel, government aviation authority personnel, air traffic controllers, airline employees, and aircraft manufacturers.

32. The computer network for calculating and distributing the true aircraft braking friction coefficient of the aircraft runway or taxiway of claim 16, wherein the true aircraft braking friction coefficient calculated by the computer may be accessed by or provided to one or more of the following individuals or entities via the computer network: airline operation personnel, pilots, airport personnel, airline managers, airport managers, airport maintenance crews, pilots of aircraft scheduled to take off, land, or taxi on the aircraft runway or taxiway, personnel involved in ground operations where the aircraft runway or taxiway is located, aircraft scheduling and dispatch personnel, flight service center personnel, government aviation authority personnel, air traffic controllers, airline employees, and aircraft manufacturers.

33. The computer network for calculating and distributing the true aircraft braking friction coefficient of the aircraft runway or taxiway of claim 1 wherein at least some of the aircraft property data recorded on the flight data management system is measured substantially at or after the time when the aircraft touches down on the aircraft runway during landing.

34. The computer network for calculating and distributing the true aircraft braking friction coefficient of the aircraft runway or taxiway of claim 2 wherein at least some of the aircraft property data recorded on the flight data management system is measured substantially at or after the time when the aircraft touches down on the aircraft runway during landing.

35. The computer network for calculating and distributing the true aircraft braking friction coefficient of the aircraft runway or taxiway of claim 33 wherein at least some of the aircraft property data recorded on the flight data management system is measured substantially before or until the aircraft completes taxiing following landing.

36. The computer network for calculating and distributing the true aircraft braking friction coefficient of the aircraft runway or taxiway of claim 34 wherein at least some of the aircraft property data recorded on the flight data management system is measured substantially before or until the aircraft completes taxiing following landing.

37. The computer network for calculating and distributing the true aircraft braking friction coefficient of the aircraft runway or taxiway of claim 5 wherein at least some of the aircraft property data recorded on the flight data management system is measured substantially at or after the time when the aircraft touches down on the aircraft runway during landing.

38. The computer network for calculating and distributing the true aircraft braking friction coefficient of the aircraft runway or taxiway of claim 6 wherein at least some of the aircraft property data recorded on the flight data management system is measured substantially at or after the time when the aircraft touches down on the aircraft runway during landing.

39. The computer network for calculating and distributing the true aircraft braking friction coefficient of the aircraft runway or taxiway of claim 37 wherein at least some of the aircraft property data recorded on the flight data management system is measured substantially before or until the aircraft completes taxiing following landing.

40. The computer network for calculating and distributing the true aircraft braking friction coefficient of the aircraft runway or taxiway of claim 38 wherein at least some of the aircraft property data recorded on the flight data management system is measured substantially before or until the aircraft completes taxiing following landing.

41. The computer network for calculating and distributing the true aircraft braking friction coefficient of the aircraft runway or taxiway of claim 5 wherein at least some of the environmental parameter data is measured substantially in the vicinity of the aircraft.

42. The computer network for calculating and distributing the true aircraft braking friction coefficient of the aircraft runway or taxiway of claim 6 wherein at least some of the environmental parameter data is measured substantially in the vicinity of the aircraft.

43. The computer network for calculating and distributing the true aircraft braking friction coefficient of the aircraft runway or taxiway of claim 7 wherein at least some of the environmental parameter data is measured substantially in the vicinity of the aircraft.

44. The computer network for calculating and distributing the true aircraft braking friction coefficient of the aircraft runway or taxiway of claim 8 wherein at least some of the environmental parameter data is measured substantially in the vicinity of the aircraft.

* * * * *